United States Patent
Hartog et al.

(10) Patent No.: US 9,146,165 B2
(45) Date of Patent: Sep. 29, 2015

(54) FIBER OPTIC CABLE

(75) Inventors: Arthur H. Hartog, Winchester (GB); Andrew P. Strong, Romsey (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1939 days.

(21) Appl. No.: 12/293,424

(22) PCT Filed: Feb. 22, 2007

(86) PCT No.: PCT/GB2007/000593
§ 371 (c)(1),
(2), (4) Date: Jun. 6, 2011

(87) PCT Pub. No.: WO2007/107693
PCT Pub. Date: Sep. 27, 2007

(65) Prior Publication Data
US 2011/0229099 A1 Sep. 22, 2011

(30) Foreign Application Priority Data
Mar. 22, 2006 (GB) .................................. 0605714.5
Jan. 29, 2007 (GB) .................................. 0701563.9

(51) Int. Cl.
*G01L 1/24* (2006.01)
*G02B 6/44* (2006.01)

(52) U.S. Cl.
CPC .............. *G01L 1/242* (2013.01); *G02B 6/4401* (2013.01); *G01L 1/246* (2013.01); *G02B 6/4432* (2013.01)

(58) Field of Classification Search
CPC ..................................................... G01L 1/242
See application file for complete search history.

(56) References Cited

U.S. PATENT DOCUMENTS

| 4,441,787 | A | * | 4/1984 | Lichtenberger | ................ 385/107 |
| 5,268,983 | A | | 12/1993 | Tatarka et al. | |
| 5,566,266 | A | * | 10/1996 | Nave et al. | ........................ 285/95 |
| 5,611,016 | A | | 3/1997 | Fangmann et al. | |
| 7,016,576 | B2 | * | 3/2006 | Cocchini et al. | .............. 385/104 |

(Continued)

FOREIGN PATENT DOCUMENTS

| GB | 2329722 A | 3/1999 |
| GB | 2401940 A | 11/2004 |

OTHER PUBLICATIONS

Ohashi et al., "Performance of optical cable composed of dispersion-shifted single-mode fibers", Journal of Lightwave Technology, vol. 4(10), 1986, pp. 1571-1575.*

(Continued)

*Primary Examiner* — Michelle R Connelly
(74) *Attorney, Agent, or Firm* — David J. Groesbeck

(57) ABSTRACT

A fiber optic cable includes a strain element including a first optical fiber and an optical element including a second optical fiber. The optical element is compliantly coupled with the strain element to transfer a portion of strain experienced by the strain element to the optical element. A fiber optic cable includes a strain transfer member, a central optical fiber disposed through the strain transfer member, and a tight jacket mechanically coupling the central optical fiber and the strain transfer member. The fiber optic cable further includes a compliant layer disposed about and affixed to the strain transfer member; a peripheral optical fiber disposed in the compliant layer, such that a portion of the strain experienced by the strain transfer member is transferred to the peripheral optical fiber via the compliant layer; and a protective cover disposed about the compliant layer.

18 Claims, 3 Drawing Sheets

(56) References Cited

U.S. PATENT DOCUMENTS 7,245,791 B2 * 7/2007 Rambow et al. ............... 385/12
2006/0013523 A1 1/2006 Childlers et al.

OTHER PUBLICATIONS

Tateda et al., "First measurement of strain distribution along field-installed optical fibers using Brillouin spectroscopy", Journal of Lightwave Technology, vol. 8(9), 1990, pp. 1269-1272.*
Kersey, et al., "Fiber grating sensors", Journal of Lightwave Technology, vol. 15(8), 1997, pp. 1442-1463.
Maughan, et al., "Simultaneous distributed fibre temperature and strain sensor using microwave coherent detection of spontaneous Brillouin backscatter", Measurement Science and Technology, vol. 12(7), 2001, pp. 834-842.
Ohashi, et al., "Performance of optical cable composed of dispersion-shifted single-mode fibers", Journal of Lightwave Technology, vol. 4(10), 1986, pp. 1571-1575.
International Search Report and Written Opinion issued in PCT/GB2007/000593 on Jun. 8, 2007, 8 pages.
Tateda, et al., "First measurement of strain distribution along field-installed optical fibers using Brillouin spectroscopy", Journal of Lightwave Technology, vol. 8(9), 1990, pp. 1269-1272.

* cited by examiner

FIBER OPTIC CABLE

BACKGROUND OF THE INVENTION

1. Field of the Invention

The present invention relates to fiber optic cables.

2. Description of Related Art

In the field of fiber optic sensors, there are a number of techniques for measuring temperature and strain. Two of the most well known techniques employ fiber Bragg gratings and Brillouin backscatter. Fiber Bragg gratings are devices, inscribed into an optical fiber, which have spectral characteristics (e.g., transmission and reflection) that are dependent upon the strain and temperature of the fiber at the grating. Common fiber Bragg gratings have a reflection peak that changes in wavelength as a function of temperature and strain. Typically, when the fiber Bragg grating is operated with light exhibiting a wavelength of about 1550 nanometers, the response of a fiber Bragg grating to temperature is about 10 picometers per degree Kelvin and the response to strain is about 1.2 picometers per microstrain. Thus, it is difficult from a single measurement to separate temperature effects from strain effects.

In contrast to fiber Bragg gratings, which are discrete devices, Brillouin backscatter is a distributed sensing technique. In this technique, a signal propagated through all parts of an unmodified optical fiber is used to provide a local measure of temperature and strain. The Brillouin backscatter technique exploits the Brillouin interaction between a pulsed optical beam and a continuous wave optical beam counter-propagating in an optical fiber. When the optical frequency of the continuous wave beam is greater than that of the pulsed beam by an amount equal to the Brillouin frequency shift at some point in the fiber, the pulsed beam is amplified through the Brillouin interaction and the continuous wave beam experiences loss. The Brillouin frequency shift and the intensity of the amplification and loss are both strain and temperature sensitive. Using both the intensity and frequency shift information, it is possible to recover the temperature and strain distributions along the optical fiber. Alternatively, it is possible to measure the spontaneous Brillouin backscatter using just a probe pulse.

In certain circumstances, however, it is desirable to use only the frequency shift information, rather than the frequency shift and intensity information, particularly wherein the measurement technique provides only the frequency shift measure of the Brillouin backscattering. In this case, it is necessary to find alternative ways of separating temperature from strain.

One conventional approach of separating temperature from strain is to co-locate two optical fibers, one of which is shielded from strain and the other of which is subjected to strain. Combining measurements from the two fibers provides a means of independently determining temperature and strain. One method of shielding an optical fiber from strain is "loose tube buffering," wherein the fiber is contained within an outer protective tube such that the fiber can move to some extent. Another method of shielding an optical fiber from strain is the use of a "slotted core," wherein the optical fiber resides in a channel or groove that has been formed on a surface of a rod-shaped core. Frequently, voids about the fiber are filled with excess fiber. Friction, however, may exist between the optical fiber and the loose tube or slotted core. Moreover, the voids may not be uniformly filled with excess fiber. Accordingly, the optical fiber may not be entirely isolated from strain. Furthermore, strain independence in loose-tube construction is conventionally achieved over a strain range limited to approximately the excess optical fiber length in the tube, which is typically a length of up to 0.7 percent of the cable length. Cable strains greater than this amount will cause strain independence to break down.

While there are many designs of fiber optic cables well known in the art that address cable strain, considerable shortcomings remain.

BRIEF SUMMARY OF THE INVENTION

There is a need for an improved fiber optic cable. Therefore, it is an object of the present invention to provide such cable.

The fiber optic cable includes a strain element including a first optical fiber and an optical element including a second optical fiber. The optical element is compliantly coupled with the strain element to transfer a portion of the strain experienced by the strain element to the optical element.

In another aspect of the present invention, a fiber optic cable is provided. The fiber optic cable includes a strain transfer member, a central optical fiber disposed through the strain transfer member, and a tight jacket mechanically coupling the central optical fiber and the strain transfer member. Strain experienced by the strain transfer member is transferred to the central optical fiber via the tight jacket. The fiber optic cable further includes a compliant layer disposed about and affixed to the strain transfer member; a peripheral optical fiber disposed in the compliant layer, such that a portion of strain experienced by the strain transfer member is transferred to the peripheral, optical fiber via the compliant layer; and a protective cover disposed about the compliant layer.

In yet another aspect, the present invention provides a fiber optic cable. The fiber optic cable includes a strain transfer member, a plurality of central optical fibers disposed through the strain transfer member, and a plurality of tight jackets, corresponding to the plurality of central optical fibers, mechanically coupling the plurality of central optical fibers with the strain transfer member. Strain experienced by the strain transfer member is transferred to the plurality of central optical fibers via the plurality of tight jackets. The fiber optic cable further includes a compliant layer disposed about and affixed to the strain transfer member; a peripheral optical fiber disposed in the compliant layer, such that a portion of strain experienced by the strain transfer member is transferred to the peripheral optical fiber via the compliant layer; and a protective cover disposed about the compliant layer.

In another aspect of the present invention, a fiber optic cable is provided. The fiber optic cable includes a strain transfer member and at least one central optical fiber disposed through and rigidly affixed to the strain transfer member, such that strain experienced by the strain transfer member is transferred to the at least one central optical fiber. The fiber optic cable further includes a compliant layer disposed about and affixed to the strain transfer member; a plurality of peripheral optical fibers disposed in the compliant layer, such that a portion of strain experienced by the strain transfer member is transferred to each of the plurality of peripheral optical fibers via the compliant layer; and a protective cover disposed about the compliant layer.

The present invention provides significant advantages, including: (1) providing a means for separating the effects of strain and temperature in a fiber optic cable; (2) providing a fiber optic cable in which cable strains on a first optical fiber of the cable have a known relationship to cable strains on a second optical fiber of the cable; and (3) providing a means to determine strain and temperature based upon the optical signal intensity or optical signal frequency shift using Brillouin techniques.

Additional objectives, features and advantages will be apparent in the written description which follows.

BRIEF DESCRIPTION OF THE DRAWINGS

The novel features characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit in the reference numerals denotes the first figure in which the respective reference numerals appear, wherein:

Figure 1:
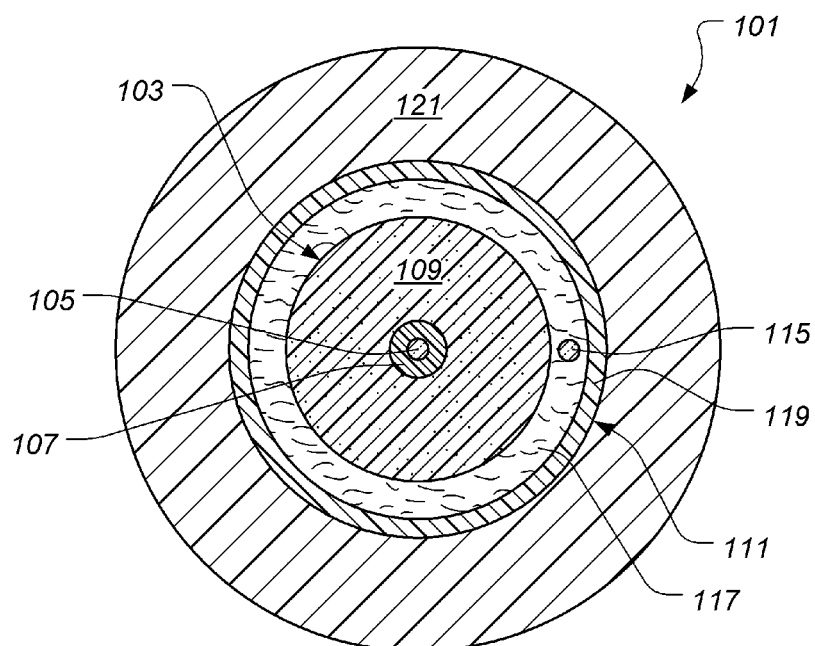
FIG. 1 is a stylized, cross-sectional view of a first illustrative embodiment of a fiber optic cable according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a fiber optic cable comprising a first optical fiber and a second optical fiber. The cable is configured such that the first optical fiber is subjected to a first, non-zero percentage of strain experienced by the cable, while the second optical fiber is subjected to a second, but different, non-zero percentage of strain applied to the cable. The percentages of cable strain applied to the first optical fiber and the second optical fiber are proportional to the strain experienced by the cable, even at low or high strain levels.

FIG. 1 depicts a first illustrative embodiment of a fiber optic cable. 101 according to the present invention. In the illustrated embodiment, cable 101 comprises a strain element 103, including a central optical fiber 105, a tight jacket 107, and a strain transfer member 109. Central optical fiber 105 extends through tight jacket 107 and strain transfer member 109, such that tight jacket 107 is disposed between central optical fiber 105 and strain transfer member 109. Central optical fiber 105 is affixed to tight jacket 107 and tight jacket 107 is affixed to strain transfer member 109, such that at least a portion of the strain experienced by cable 101 is transferred to central optical fiber 105 via strain transfer member 109. Central optical fiber 105 is mechanically coupled to strain transfer member 109 by tight jacket 107. Preferably, strain transfer member 109 comprises a fiber-reinforced, polymeric material, such as a carbon-reinforced composite material. Tight jacket 107 comprises nylon or other such suitable material. It is preferable that strain element 103 is produced using a pultrusion process to ensure uniform, contiguous attachment of central optical fiber 105 to tight jacket 107 and to ensure uniform, contiguous attachment of tight jacket 107 to strain transfer member 109. In some, but not all, embodiments, the cross-sectional area of strain element 103 is within a range of about 2 mm$^2$ to about 4 mm$^2$. Strain element 103 contributes significantly to the modulus of cable 101.

Cable 101 further comprises an optical element 111 that is mechanically coupled to strain element 103, such that a portion of the strain experienced by strain element 103 is transmitted to optical element 111. Optical element 111 includes a peripheral optical fiber 115, a compliant layer 117, and a protective cover 119. Peripheral optical fiber 115 is disposed within compliant layer 117. Protective cover 119, preferably comprising nylon or other such suitable material, is disposed about compliant layer 117. Compliant layer 117 mechanically couples strain element 103 to peripheral optical fiber 115. However, because compliant layer 117 is flexible, only a portion of the strain experienced by strain element 103 (and, in particular central optical fiber 105) is transmitted to peripheral optical fiber 115. Preferably, compliant layer 117 comprises a silicone rubber or the like. Preferably, cable 101 further comprises an outer covering 121 disposed about optical element 111 to provide further strength to the cable in terms of bend resistance, crush resistance, ultraviolet light protection, moisture exclusion, and the like, although the present invention is not so limited.

Preferably, central optical fiber 105 and peripheral optical fiber 115 are single mode optical fibers. Generally, single mode optical fibers propagate optical signals only at about a certain wavelength. Single mode optical fibers provide improved fidelity of the propagated optical signals over long distances, as compared to multi-mode optical fibers. Moreover, it is preferable in certain implementations for central optical fiber 105 and peripheral optical fiber 115 to exhibit a negative coefficient of chromatic dispersion. Generally, positive chromatic dispersion causes separation of optical waves into their spectral components, thus reducing data transfer rates. Furthermore, it is desirable for central optical fiber 105 and peripheral optical fiber 115 to exhibit a cut-off wavelength that is close to the operating wavelength of cable 101. In general, the cut-off wavelength is the longest wavelength that can be propagated via an optical fiber (e.g., central optical fiber 105 or peripheral optical fiber 115) to enhance signal fidelity.

As noted above, a higher percentage of cable strain is transferred to central optical fiber 105 than to peripheral optical fiber 115, as peripheral optical fiber 115 is disposed in compliant layer 117. The particular percentage difference between the cable strain transferred to central optical fiber 105 and the cable strain transferred to peripheral optical fiber 115 varies depending upon the particular construction of cable 101. For example, the type of material used in compliant layer 117, as well as the thickness of compliant layer 117, affects the amount of strain experienced by strain element 103 that is transferred to central optical fiber 105. The percentage difference between the cable strain transferred to central optical fiber 105 and the cable strain transferred to peripheral optical fiber 115 may be affected by other aspects of the configuration of cable 101. The percentage difference between the cable strain transferred to central optical fiber 105 and the cable strain transferred to peripheral optical fiber 115 for a particular configuration of cable 101, however, can be determined either by empirical or theoretical means.

Figure 2:
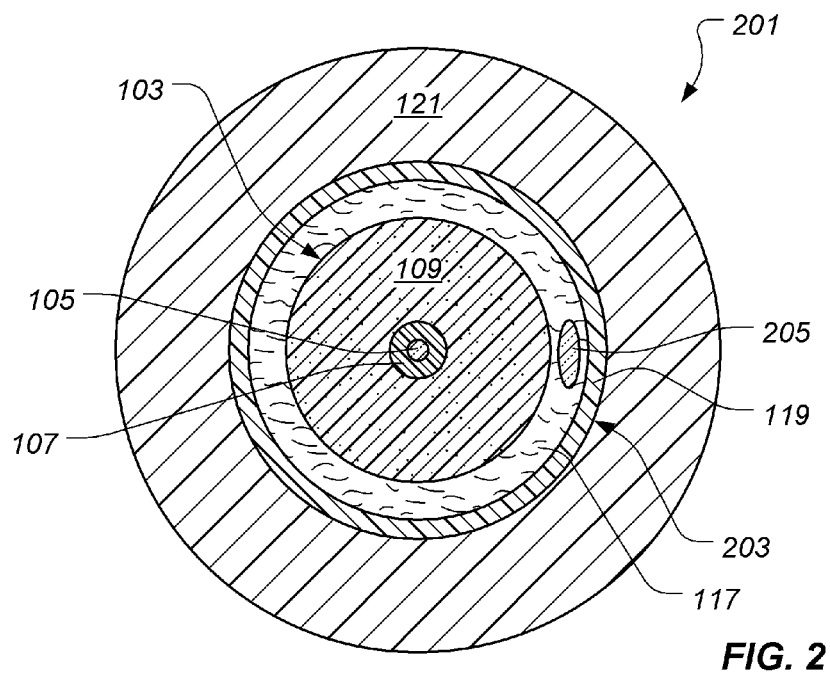
FIG. 2 is a stylized, cross-sectional view of a second illustrative embodiment of a fiber optic cable according to the present invention.
Figure 3:
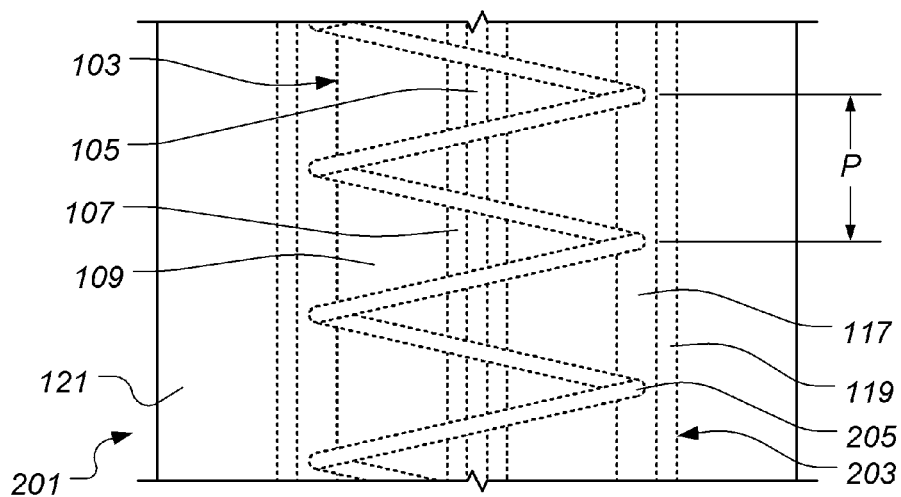
FIG. 3 is a stylized, side, elevational view of the fiber optic cable of FIG. 2.

In the embodiment of FIG. 1, peripheral optical fiber 115 extends through cable 101 substantially parallel to central optical fiber 105. FIGS. 2 and 3, however, depict a second illustrative embodiment of a fiberoptic cable 201 according to the present invention, wherein an optical element 203 includes a peripheral optical fiber 205 extending through cable 201 in a helical fashion about strain element 103. In this embodiment, as in the embodiment of FIG. 1, peripheral optical fiber 205 is disposed in compliant layer 117. It should be noted, however, that the present invention is not limited to the pitch P of peripheral optical fiber 205 illustrated in FIG. 3. Rather, the scope of the present invention encompasses peripheral optical fiber 205 having any pitch P suitable for the particular implementation of cable 201.

Moreover, the present invention contemplates a peripheral optical fiber (e.g., peripheral optical fibers 115 and 205) having configurations other than those shown in FIGS. 1-3. For example, a peripheral optical fiber may extend along a path not parallel with a central optical fiber but also not in a helical fashion. Cable 201 further comprises strain element 103 (including central optical fiber 105, tight jacket 107, and strain transfer member 109) and protective cover 119, as described above concerning the embodiment of FIG. 1. Preferably, cable 201 includes outer covering 121, as described above regarding the embodiment of FIG. 1.

Figure 4:
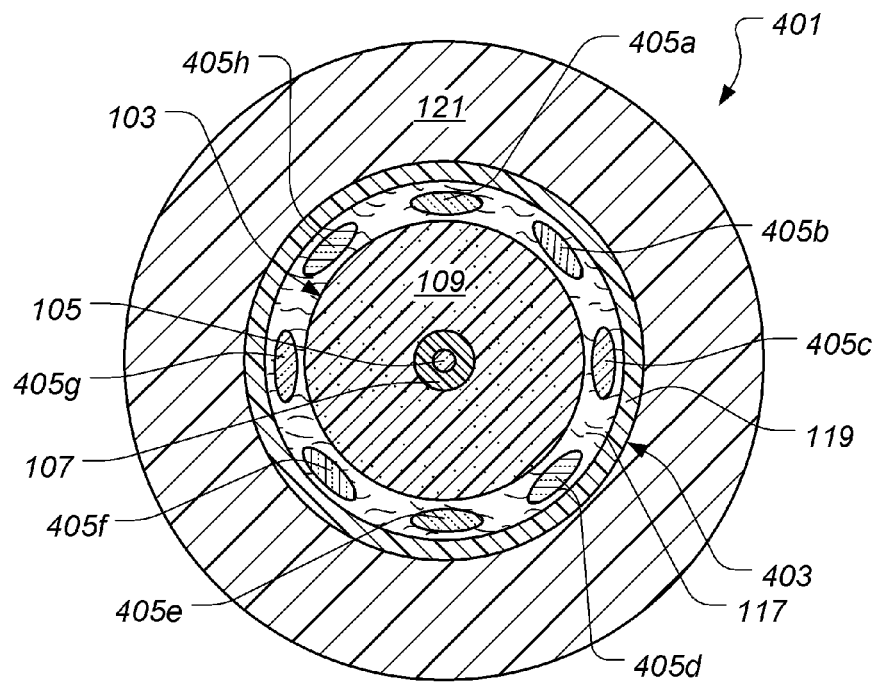
FIG. 4 is a stylized, cross-sectional view of a third illustrative embodiment of a fiber optic cable according to the present invention.

While the embodiments of FIGS. 1-3 include only one peripheral optical fiber (e.g., peripheral optical fiber 115 of FIG. 1 and peripheral optical fiber 205 of FIGS. 2 and 3), the scope of the present invention is not so limited. Rather, the present invention contemplates any suitable number of peripheral optical fibers. For example, a third illustrative embodiment of a fiber optic cable 401 according to the present invention is provided in FIG. 4. Cable 401 comprises strain element 103 (including central optical fiber 105, tight jacket 107, and strain transfer member 109), compliant layer 117, and protective cover 119, as described above concerning the embodiment of FIG. 1. However, cable 401 includes an optical element 403 including a plurality of peripheral optical fibers 405a-405h disposed in compliant layer 117, rather than only one peripheral optical fiber 115 disposed in compliant layer 117, as in cable 101.

Preferably, each of the plurality of peripheral optical fibers 405a-405h extends through cable 401 in a helical fashion about strain element 103, as does peripheral optical fiber 205 in the embodiment of FIGS. 2 and 3. The scope of the present invention, however, is not so limited. Rather, one or more of the plurality of peripheral optical fibers 405a-405h may extend through cable 201 along non-helical paths that are not parallel with central optical fiber 105.

Figure 5:
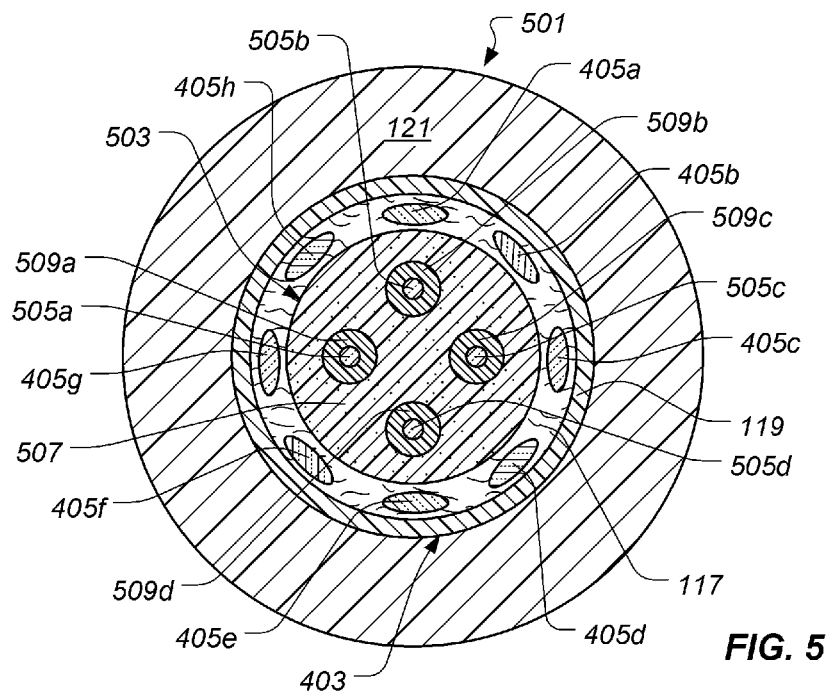
FIG. 5 is a stylized, cross-sectional view of a fourth illustrative embodiment of a fiber optic cable according to the present invention.

While embodiments of the present invention shown in FIGS. 1-4 and described above include a single central optical fiber 105, the present invention is not so limited. Rather, as shown in FIG. 5, a fourth illustrative embodiment of a fiber optic cable 501 comprises a strain element 503 including a plurality of central optical fibers 505a-505d disposed in a strain transfer member 507. In the illustrated embodiment, each of the plurality of central optical fibers 505a-505d are mechanically coupled with strain transfer member 507 via a corresponding plurality of tight jackets 509a-509d. In one embodiment, the construction of tight jackets 509a-509d corresponds to the construction of tight jacket 107, described above in relation to FIG. 1. Irrespective of the particular construction, the plurality of tight jackets 509a-509d affix the plurality of central optical fibers 505a-505d, respectively, to strain transfer member 507, such that at least a portion of the strain experienced by cable 501 is transferred to each of the plurality of central optical fibers 505a-505d.

Figure 6:
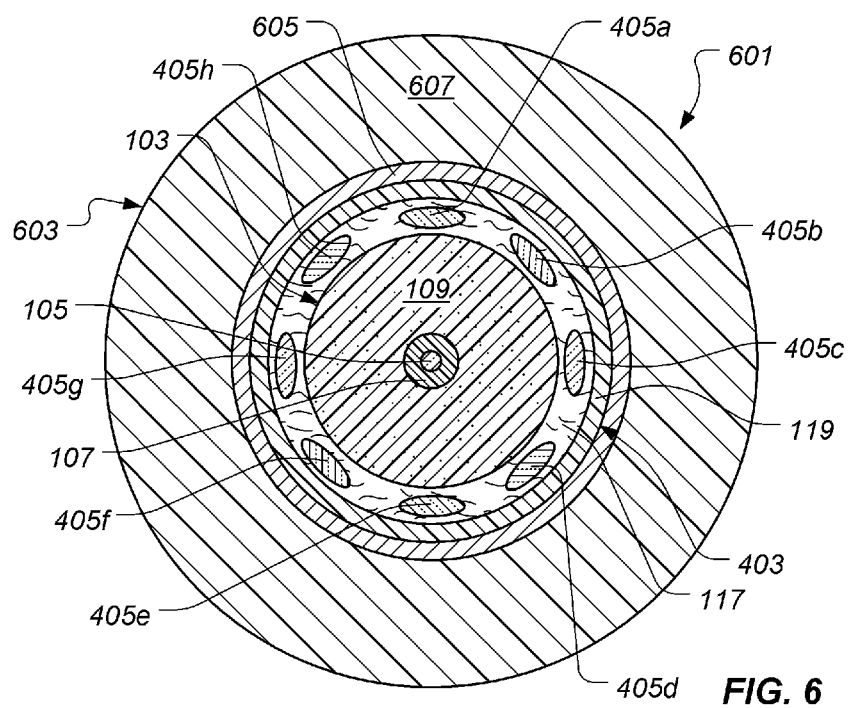
FIG. 6 is a stylized, cross-sectional view of a fifth illustrative embodiment of a fiber optic cable according to the present invention.

It should be noted that any of the fiber optic cable embodiments disclosed herein may include constructions of outer covering 121 alternative to that shown in FIGS. 1-5, depending at least in part upon the particular implementation of the fiber optic cable. In particular, such configurations of outer covering 121 provide further strength to the cable in terms of bend resistance, crush resistance, ultraviolet light protection, moisture exclusion, or the like for a particular implementation. For example, as shown in FIG. 6, a fifth illustrative embodiment of a fiber optic cable 601 according to the present invention includes an outer covering 603 comprising a metallic tape layer 605 and an outer sheath 607. Metallic tape layer 605 may comprise, for example, aluminum, an alloy of aluminum, or the like. In one embodiment, outer sheath 607 is made from a tough, chemically-resistant material, such as polyurethane.

According to the present invention, the peripheral optical fiber or fibers (e.g., peripheral optical fibers 115, 205, or 405a-405h) experience only a portion of the cable stress imparted to the central optical fiber or fibers (e.g., central optical fibers 105 or 505a-505d). Accordingly, by using the fiber optic cable of the present invention, a differential response to strain between a central optical fiber and a peripheral optical fiber can be obtained. Using Brillouin backscatter techniques, strain and temperature can be calculated from the optical signal intensity or optical signal frequency shift. Using fiber Bragg grating techniques, strain and temperature can be calculated from the wavelength shifts from one grating sited on each of a central fiber and a peripheral fiber.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below. Although the present invention is shown in a limited number of forms, it is not limited to just these forms, but is amenable to various changes and modifications.

What is claimed is:

1. A fiber optic cable, comprising:
   a strain element including a strain transfer member and a first optical fiber disposed within the strain transfer member, such that the strain transfer member transfers strain experienced by the strain element to the first optical fiber; and
   an optical element including a compliant layer and a second optical fiber disposed within the compliant layer, the compliant layer disposed about the strain element to couple a portion of the strain experienced by the strain element to the optical element, such that the first optical fiber experiences a first non-zero amount of the strain experienced by the strain element and the second optical fiber experiences a second non-zero amount of the strain experienced by the strain element different than the first non-zero amount of the strain.

2. The fiber optic cable, according to claim 1, wherein the strain element comprises a tight jacket mechanically coupling the first optical fiber and the strain transfer member.

3. The fiber optic cable, according to claim 2, wherein the first optical fiber, the tight jacket, and the strain transfer member form a pultruded strain element.

4. The fiber optic cable, according to claim 3, wherein the outer covering comprises:
   an outer sheath disposed about the protective cover; and
   a metallic tape layer disposed between the outer sheath and the protective cover.

5. The fiber optic cable, according to claim 1, wherein the optical element comprises a protective cover disposed about the compliant layer.

6. The fiber optic cable, according to claim 5, further comprising an outer covering disposed about the protective cover.

7. The fiber optic cable, according to claim 1, configured to be operatively associated with at least one of a fiber Bragg grating and a Brillouin sensor.

8. The fiber optic cable, according to claim 1, wherein the strain transfer member comprises a fiber-reinforced composite material.

9. The fiber optic cable, according to claim 1, wherein at least one of the first optical fiber and the second optical fiber is a single-mode optical fiber.

10. The fiber optic cable, according to claim 1, wherein at least one of the first optical fiber and the second optical fiber exhibits a negative coefficient of chromatic dispersion.

11. The fiber optic cable, according to claim 1, wherein at least one of the first optical fiber and the second optical fiber exhibits a cut-off wavelength near an operational wavelength of the at least one of the first optical fiber and the second optical fiber.

12. The fiber optic cable, according to claim 1, wherein the compliant layer comprises a silicone elastomer.

13. The fiber optic cable, according to claim 1, wherein the second optical fiber extends helically through the compliant layer.

14. The fiber optic cable, according to claim 1, wherein the second optical fiber extends through the compliant layer substantially parallel to the first optical fiber.

15. The fiber optic cable according to claim 1, wherein the compliant layer is disposed about the strain transfer member for mechanically coupling the strain element and the optical element.

16. The fiber optic cable, according to claim 1, wherein the strain element includes a plurality of first optical fibers disposed within the strain transfer member.

17. The fiber optic cable according to claim 1, wherein the optical element includes a plurality of second optical fibers disposed within the compliant layer.

18. The fiber optic cable, according to claim 17, wherein the plurality of second optical fibers extends helically through the compliant layer.

* * * * *